United States Patent [19]
DeLong et al.

[11] Patent Number: 6,160,842
[45] Date of Patent: Dec. 12, 2000

[54] DEVICE AND METHOD FOR SERIALLY COMMUNICATING

[75] Inventors: Ronald Verne DeLong, Mesa; Benjamin R. Davis, Chandler, both of Ariz.

[73] Assignee: Motorola, Inc., Schaumburg, Ill.

[21] Appl. No.: 09/024,443

[22] Filed: Feb. 17, 1998

[51] Int. Cl.[7] ................................. H04B 1/38
[52] U.S. Cl. .................... 375/219; 375/221; 375/257; 375/259
[58] Field of Search .................... 375/219, 220, 375/222, 221, 257, 259, 358, 364; 327/319, 333; 326/82; 455/572

[56] References Cited

U.S. PATENT DOCUMENTS

| | | | |
|---|---|---|---|
| 4,222,116 | 9/1980 | Groves | 375/55 |
| 4,530,088 | 7/1985 | Hamstra et al. | 370/110 |
| 5,412,688 | 5/1995 | Marbot | 375/220 |
| 5,504,782 | 4/1996 | Campbell, Jr. | 375/259 |
| 5,578,939 | 11/1996 | Beers et al. | 326/30 |
| 5,592,510 | 1/1997 | Van Brunt et al. | 375/220 |
| 5,694,428 | 12/1997 | Campana, Jr. | 375/260 |

*Primary Examiner*—Stephen Chin
*Assistant Examiner*—Dac V. Ha
*Attorney, Agent, or Firm*—Anthony M. Martinez

[57] ABSTRACT

A serial communication device (10) and a method for serially communicating. The serial communication device (10) has a first transceiver (11) and a second transceiver (12) that send data to each other. The first transceiver (11) is capable of providing power or the operating potential to the second transceiver (12). The first transceiver (11) sends command data at a variable data rate to the second transceiver (12) using a voltage signal (30). The second transceiver (12) receives the command data and sends response data to the first transceiver (11) using a current signal (40).

19 Claims, 2 Drawing Sheets

50

DEVICE AND METHOD FOR SERIALLY COMMUNICATING

BACKGROUND OF THE INVENTION

The present invention relates, in general, to communication devices and, more particularly, to serial communication devices.

Serial communication systems typically include clocking circuitry to maintain synchronization of the serial data. The clocking circuitry of serial communication systems use precision timers or wait timers to synchronize the serial data. These timers add complexity and cost to the serial communication system.

Protocols used for transmitting and receiving serial data usually have a fixed data rate and word length. Serial communication systems employing fixed data rates and word lengths are limited in their applications. For example, manufacturers of air bag systems prefer variable data rates for serial communication so that the serial data of the air bag system communicates at a low data rate during normal operation to avoid interference with other systems in the automobile. In the event of a crash, it is necessary for the air bag system to communicate at a high data rate to activate the necessary safety devices in a timely manner.

Accordingly, it would be advantageous to have a device and method for variable data rate serial communication. It would be of further advantage to eliminate costly and complex clocking circuitry used for synchronizing the serial data.

DETAILED DESCRIPTION OF THE DRAWINGS

Generally, the present invention provides a device and method for serially communicating between transceivers. More particularly, the present invention provides a serial communication method or protocol that transmits data at variable data rates and variable word lengths. It should be noted that a data rate is determined by the bit rate of each bit within a word and a word length is determined by the number of bits within a word. In addition, the present invention includes a method for full duplex serial communication, i.e., simultaneously sending and receiving binary data in a serial fashion. Binary data includes words or frames having bits, wherein each bit typically has a logic value of zero or one.

Figure 1:
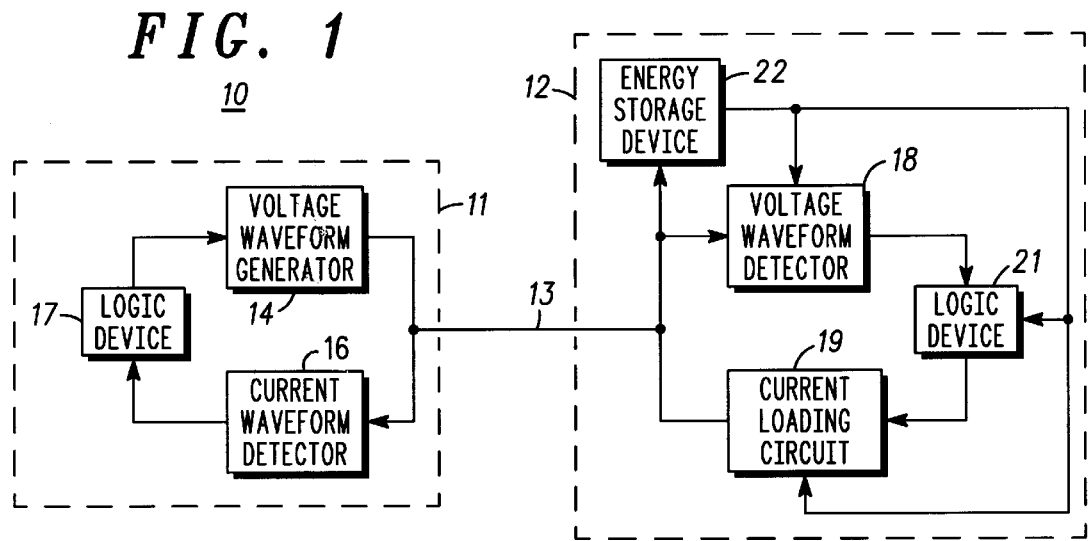
FIG. 1 is a block diagram of a point-to-point serial communication device in accordance with a first embodiment of the present invention.

FIG. 1 is a block diagram of a point-to-point serial communication device 10 in accordance with a first embodiment of the present invention. Serial communication device 10 has a transceiver 11 coupled to a transceiver 12 via a transmission path 13. Transceiver 11 is comprised of a voltage waveform generator 14, a current waveform detector 16, and a logic device 17. More particularly, the output of voltage waveform generator 14 is commonly connected to the input of current waveform detector 16 and to transmission path 13. The input of logic device 17 is connected to the output of current waveform detector 16 and the output of logic device 17 is connected to the input of voltage waveform generator 14.

Transceiver 12 is comprised of a voltage waveform detector 18, a current loading circuit 19, a logic device 21, and an energy storage device 22. The input of voltage waveform detector 18 is commonly connected to the output of current loading circuit 19, to transmission path 13, and to the input of energy storage device 22. The output of voltage waveform detector 18 is connected to the input of logic device 21 and the output of logic device 21 is connected to the input of current loading circuit 19. The output of energy storage device 22 is commonly connected to the power input of voltage waveform detector 18, the power input of current loading circuit 19, and the power input of logic device 21. An input of a device for receiving power or the operating potential is referred to as a power input of the device.

The operation of serial communication device 10 is described with reference to FIGS. 1–3. A variable number of words having a variable number of bits can be transmitted and received by transceiver 11. Words generated and transmitted by transceiver 11 are referred to as command words and words generated and transmitted by transceiver 12 are referred to as response words. Logic device 17 determines the number of command words and the binary data of each command word, i.e., the number of bits within each command word and the logic value of each bit of each command word. In addition, logic device 17 generates a sequence of bits or a serial stream of binary command data from the binary data of the command words. The serial stream of binary command data is transmitted from the output of logic device 17 to the input of voltage waveform generator 14. Suitable devices for logic device 17 include a microcontroller, a microprocessor, or the like. Voltage waveform generator 14 converts the serial stream of binary command data into a pulse width modulated voltage waveform such as voltage signal 30 illustrated in FIG. 2. Suitable components for voltage waveform generator 14 include transistors or op amps configured for generating a pulse width modulated voltage waveform from a serial stream. Voltage signal 30 is transmitted from the output of voltage waveform generator 14 to the input of voltage waveform detector 18 and the input of energy storage device 22 via transmission path 13. Voltage waveform detector 18 decodes voltage signal 30 to retrieve the serial stream of binary command data. The serial stream of binary command data is transmitted from the output of voltage waveform detector 18 to the input of logic device 21. Logic device 21 retrieves the binary data of the command words from the serial stream of binary command data and processes the command words. Response words are generated by logic device 21 in response to the received command words.

Logic device 21 determines the logic value of each bit of the response words. In addition, logic device 21 generates a serial stream of binary response data from the binary data of the response words. The serial stream of binary response data is transmitted from the output of logic device 21 to the input of current loading circuit 19. Current loading circuit 19 converts the serial stream of binary response data into a current waveform such as current signal 40 illustrated in FIG. 3. Current signal 40 is transmitted from the output of current loading circuit 19 to the input of current waveform detector 16 via transmission path 13. Current waveform detector 16 decodes current signal 40 to retrieve the serial stream of binary response data. The serial stream of binary response data is transmitted from the output of current waveform detector 16 to the input of logic device 17. Logic device 17 retrieves the binary data of the response words from the serial stream of binary response data and processes the response words.

Figure 2:
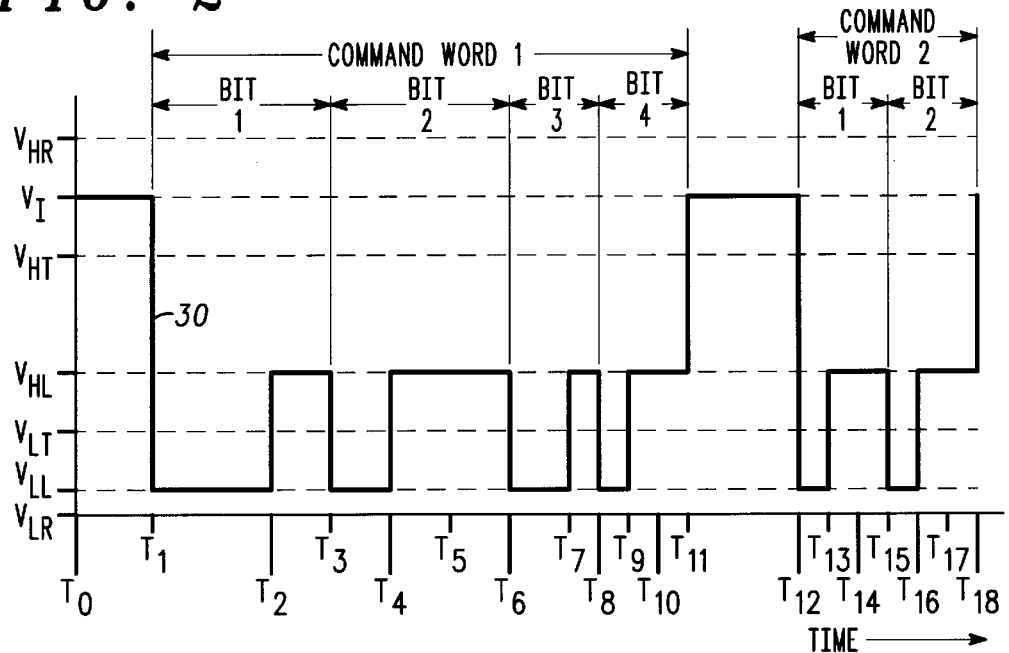
FIG. 2 is a voltage signal diagram illustrating a serial communication protocol in accordance with the present invention.

FIG. 2 is a voltage signal diagram illustrating a serial communication protocol in accordance with the present invention. More particularly, FIG. 2 illustrates the transmission of two command words, COMMAND WORD 1 and COMMAND WORD 2. The word length of COMMAND WORD 1 is greater than the word length of COMMAND WORD 2. COMMAND WORD 1 is a four bit word which is comprised of BIT 1, BIT 2, BIT 3, and BIT 4, whereas COMMAND WORD 2 is a two bit word comprised of BIT 1 and BIT 2. $V_{HR}$ represents a high voltage reference level and $V_{LR}$ represents a low voltage reference level. $V_{HT}$ represents a high voltage threshold level and $V_{LT}$ represents a low voltage threshold level. $V_{HL}$ represents a high voltage logic level and $V_{LL}$ represents a low voltage logic level. $V_I$ represents a voltage idle level.

In accordance with the present invention, the start of a command word occurs when a voltage waveform crosses voltage level $V_{HT}$ in a direction from voltage level $V_{HR}$ towards voltage level $V_{LR}$. The end of a command word occurs when the voltage waveform crosses voltage level $V_{HT}$ in a direction from voltage level $V_{LR}$ towards voltage level $V_{HR}$. Thus, the start and end of a command word each employ a single transition of the voltage waveform.

The start of a bit within a command word occurs when the voltage waveform crosses voltage level $V_{LT}$ in a direction from voltage level $V_{HR}$ towards voltage level $V_{LR}$. The end of a bit within a command word occurs when the voltage waveform crosses voltage level $V_{LT}$ in a direction from voltage level $V_{LR}$ towards voltage level $V_{HR}$ and then either crosses voltage level $V_{LT}$ in a direction from voltage level $V_{HR}$ towards voltage level $V_{LR}$ or crosses voltage level $V_{HT}$ in a direction from voltage level $V_{LR}$ towards voltage level $V_{HR}$. Thus, the start of a bit employs a single transition of the voltage waveform and the end of a bit employs two transitions of the voltage waveform.

The logic value of a bit within a command word is determined by measuring the amount of time the voltage waveform is between voltage level $V_{LR}$ and voltage level $V_{LT}$ relative to the amount of time the voltage waveform is between voltage level $V_{LT}$ and voltage level $V_{HT}$. If the voltage waveform of the bit is between voltage levels $V_{LR}$ and $V_{LT}$ for a longer period of time than it is between voltage levels $V_{LT}$ and $V_{HT}$, the bit is defined as being a logic zero. If the voltage waveform of the bit is between voltage levels $V_{LT}$ and $V_{HT}$ for a longer period of time than it is between voltage levels $V_{LR}$ and $V_{LT}$, the bit is defined as being a logic one. In other words, the logic value of a bit of a command word is logic zero when the amount of time that the voltage waveform is between voltage level $V_{LR}$ and voltage level $V_{LT}$ is greater than the amount of time that the voltage waveform is between voltage level $V_{LT}$ and voltage level $V_{HT}$. The logic value of a bit of a command word is logic one when the amount of time that the voltage waveform is between voltage level $V_{LT}$ and voltage level $V_{HT}$ is greater than the amount of time that the voltage waveform is between voltage level $V_{LR}$ and voltage level $V_{LT}$. It should be understood that the definition of logic zero and logic one is a matter of choice. In other words, a logic one can be defined as being when the amount of time that the voltage waveform is between voltage level $V_{LR}$ and voltage level $V_{LT}$ is greater than the amount of time that the voltage waveform is between voltage level $V_{LT}$ and voltage level $V_{HT}$.

Still referring to FIG. 2, voltage signal 30 has a value equal to $V_I$ between times $T_0$ and $T_1$. COMMAND WORD 1 starts at time $T_1$ when voltage signal 30 crosses voltage level $V_{HT}$ in a negative direction from voltage level $V_{HR}$ towards voltage level $V_{LR}$. BIT 1 of COMMAND WORD 1 also starts at time $T_1$ when voltage signal 30 crosses voltage level $V_{LT}$ in the negative direction. BIT 1 of COMMAND WORD 1 ends when voltage signal 30 crosses voltage level $V_{LT}$ at time $T_2$ in a positive direction from voltage level $V_{LR}$ towards voltage level $V_{HR}$ followed by voltage signal 30 crossing voltage level $V_{LT}$ at time $T_3$ in the negative direction.

The logic value of BIT 1 of COMMAND WORD 1 is determined by comparing the amount of time voltage signal 30 is at voltage level $V_{LL}$ to the amount of time voltage signal 30 is at voltage level $V_{HL}$ between times $T_1$ and $T_3$. In FIG. 2, voltage signal 30 is at voltage level $V_{LL}$ between time $T_1$ and time $T_2$ and at voltage level $V_{HL}$ between time $T_2$ and time $T_3$. The amount of time between time $T_1$ and time $T_2$ is greater than the amount of time between time $T_2$ and time $T_3$; therefore, the logic value of BIT 1 of COMMAND WORD 1 is zero.

BIT 2 of COMMAND WORD 1 starts when BIT 1 of COMMAND WORD 1 ends. BIT 2 of COMMAND WORD 1 starts at time $T_3$ when voltage signal 30 crosses voltage level $V_{LT}$ in the negative direction. BIT 2 of COMMAND WORD 1 ends when voltage signal 30 crosses voltage level $V_{LT}$ at time $T_4$ in the positive direction followed by voltage signal 30 crossing voltage level $V_{LT}$ at time $T_6$ in the negative direction. Voltage signal 30 is at voltage level $V_{LL}$ between time $T_3$ and time $T_4$ and at voltage level $V_{HL}$ between time $T_4$ and time $T_6$. The amount of time between time $T_3$ and time $T_4$ is less than the amount of time between time $T_4$ and time $T_6$; therefore, the logic value of BIT 2 of COMMAND WORD 1 is one.

BIT 3 of COMMAND WORD 1 starts at time $T_6$ when voltage signal 30 crosses voltage level $V_{LT}$ in the negative direction. BIT 3 of COMMAND WORD 1 ends when voltage signal 30 crosses voltage level $V_{LT}$ at time $T_7$ in the positive direction followed by voltage signal 30 crossing voltage level $V_{LT}$ at time $T_8$ in the negative direction. Voltage signal 30 is at voltage level $V_{LL}$ between time $T_6$ and time $T_7$ and at voltage level $V_{HL}$ between time $T_7$ and time $T_8$. The amount of time between time $T_6$ and time $T_7$ is greater than the amount of time between time $T_7$ and time $T_8$; therefore, the logic value of BIT 3 of COMMAND WORD 1 is zero.

A bit period is the time between the start and the end of a bit. The bit period of BIT 1 of COMMAND WORD 1 is the amount of time between time $T_1$ and time $T_3$. The bit period of BIT 3 of COMMAND WORD 1 is the amount of time between time $T_6$ and time $T_8$. The amount of time between time $T_1$ and time $T_3$ is greater than the amount of time between time $T_6$ and time $T_8$; therefore, the bit period of BIT 1 of COMMAND WORD 1 is greater than the bit period of BIT 3 of COMMAND WORD 1. The bit period of a bit within a word is inversely proportional to the bit rate of that bit. Therefore, the bit rate of BIT 1 of COMMAND WORD 1 is less than the bit rate of BIT 3 of COMMAND WORD 1.

BIT 4 of COMMAND WORD 1 starts at time $T_8$ when voltage signal 30 crosses voltage level $V_{LT}$ in the negative direction. BIT 4 of COMMAND WORD 1 ends when voltage signal 30 crosses voltage level $V_{LT}$ at time $T_9$ in the positive direction followed by voltage signal 30 crossing voltage level $V_{HT}$ at time $T_{11}$ in the positive direction. Voltage signal 30 is at voltage level $V_{LL}$ between time $T_8$ and time $T_9$ and at voltage level $V_{HL}$ between time $T_9$ and time $T_{11}$. The amount of time between time $T_8$ and time $T_9$ is less than the amount of time between time $T_9$ and time $T_{11}$; therefore, the logic value of BIT 4 of COMMAND WORD 1 is one.

COMMAND WORD 1 ends when BIT 4 of COMMAND WORD 1 ends. COMMAND WORD 1 ends at time $T_{11}$ when voltage signal 30 crosses voltage level $V_{HT}$ in the positive direction. Voltage signal 30 is at voltage level $V_I$ between time $T_{11}$ and time $T_{12}$. COMMAND WORD 2 starts at time $T_{12}$ when voltage signal 30 crosses voltage level $V_{HT}$ in the negative direction. BIT 1 of COMMAND WORD 2 also starts at time $T_{12}$ when voltage signal 30 crosses voltage level $V_{LT}$ in the negative direction. BIT 1 of COMMAND WORD 2 ends when voltage signal 30 crosses voltage level $V_{LT}$ at time $T_{13}$ in the positive direction followed by voltage signal 30 crossing voltage level $V_{LT}$ at time $T_{15}$ in the negative direction. Voltage signal 30 is at voltage level $V_{LL}$ between time $T_{12}$ and time $T_{13}$ and at voltage level $V_{HL}$ between time $T_{13}$ and time $T_{15}$. The amount of time between time $T_{12}$ and time $T_{13}$ is less than the amount of time between time $T_{13}$ and time $T_{15}$; therefore, the logic value of BIT 1 of COMMAND WORD 2 is one.

BIT 2 of COMMAND WORD 2 starts when BIT 1 of COMMAND WORD 2 ends. BIT 2 of COMMAND WORD 2 starts at time $T_{15}$ when voltage signal 30 crosses voltage level $V_{LT}$ in the negative direction. BIT 2 of COMMAND WORD 2 ends when voltage signal 30 crosses voltage level $V_{LT}$ at time $T_{16}$ in the positive direction followed by voltage signal 30 crossing voltage level $V_{HT}$ at time $T_{18}$ in the positive direction. Voltage signal 30 is at voltage level $V_{LL}$ between time $T_{15}$ and time $T_{16}$ and at voltage level $V_{HL}$ between time $T_{16}$ and time $T_{18}$. The amount of time between time $T_{15}$ and time $T_{16}$ is less than the amount of time between time $T_{16}$ and time $T_{18}$; therefore, the logic value of BIT 2 of COMMAND WORD 2 is one.

The amount of time between time $T_{12}$ and time $T_{15}$ is greater than the amount of time between time $T_{15}$ and time $T_{18}$; therefore, the bit period of BIT 1 of COMMAND WORD 2 is greater than the bit period of BIT 2 of COMMAND WORD 2.

COMMAND WORD 2 ends when BIT 2 of COMMAND WORD 2 ends. COMMAND WORD 2 ends at time $T_{18}$ when voltage signal 30 crosses voltage level $V_{HT}$ in the positive direction. Voltage signal 30 is at voltage level $V_I$ after time $T_{18}$. Although the first bit of each command word is shown as starting at the same time as each command word, this is not a limitation of the present invention. The first bit can start after the command word starts.

In addition to supplying a communication signal, voltage signal 30 is capable of supplying operating power, e.g., operating potential, to transceiver 12 (FIG. 1). When voltage signal 30 is greater than voltage level $V_{HT}$, transceiver 11 supplies power to transceiver 12. More particularly, when voltage signal 30 is at voltage level $V_I$, energy storage device 22 receives and stores the energy from voltage signal 30. When voltage signal 30 is less than voltage level $V_{HT}$, energy storage device 22 provides operational power to the power inputs of voltage waveform detector 18, logic device 21, and current loading circuit 19. Although serial communication device 10 is shown as including energy storage device 22, this is not a limitation of the present invention. Transceiver 12 can receive power from an external power source such as, for example, a battery.

Figure 3:
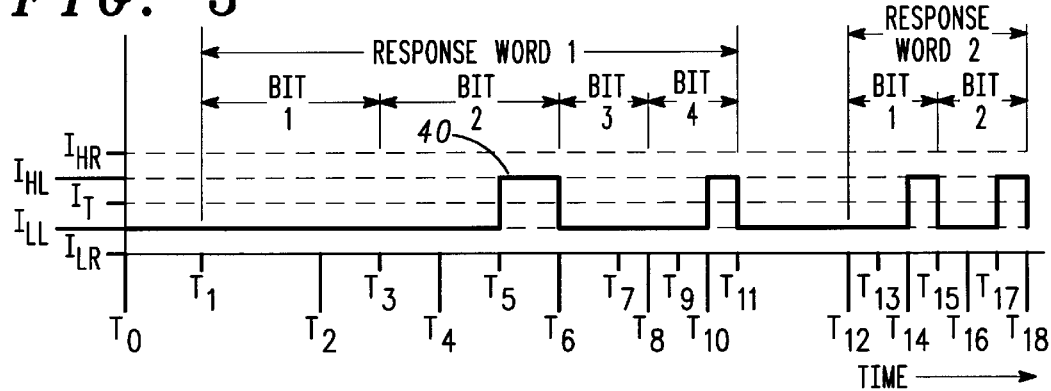
FIG. 3 is a current signal diagram illustrating a serial communication protocol in accordance with the present invention.

FIG. 3 is a current signal diagram illustrating a serial communication protocol in accordance with the present invention. More particularly, FIG. 3 illustrates the transmission of two response words, RESPONSE WORD 1 and RESPONSE WORD 2. RESPONSE WORD 1 is a four bit word which is comprised of BIT 1, BIT 2, BIT 3, and BIT 4, whereas RESPONSE WORD 2 is a two bit word comprised of BIT 1 and BIT 2. $I_{HR}$ represents a high current reference level and $I_{LR}$ represents a low current reference level. $I_{HL}$ represents a high current logic level and $I_{LL}$ represents a low current logic level. $I_T$ represents a current threshold level. It should be noted that times $T_0$–$T_{18}$ of FIG. 2 correspond to times $T_0$–$T_{18}$ of FIG. 3.

Referring to FIGS. 2 and 3, full duplex serial communication signals between, for example, transceivers 11 and 12 are illustrated. By way of example, the word lengths of the response words are equal to the word lengths of the corresponding command words. In addition, the bit periods of the bits of the response words are equal to the bit periods of the bits of the corresponding command words. More particularly, the start of RESPONSE WORD 1 corresponds to the start of COMMAND WORD 1 and the end of RESPONSE WORD 1 corresponds to the end of COMMAND WORD 1. Similarly, the start of RESPONSE WORD 2 corresponds to the start of COMMAND WORD 2 and the end of RESPONSE WORD 2 corresponds to the end of COMMAND WORD 2. In addition, the starting and ending times of BITS 1–4 of RESPONSE WORD 1 correspond to the starting and ending times of BITS 1–4 of COMMAND WORD 1, respectively. Likewise, the starting and ending times of BITS 1 and 2 of RESPONSE WORD 2 correspond to the starting and ending times of BITS 1 and 2 of COMMAND WORD 2, respectively.

By way of example, the logic value of a bit of a response word is logic zero when current signal 40 is between current levels $I_{LR}$ and $I_T$. The logic value of a bit of a response word is logic one when current signal 40 is between current level $I_T$ and current level $I_{HR}$. It should be understood that the definitions of a logic zero and logic one are a matter of choice. In other words, a logic zero can be defined as being when current signal 40 is between current levels $I_T$ and $I_{HR}$.

Current signal 40 is at current level $I_{LL}$ between time $T_1$ and time $T_3$; therefore, the logic value of BIT 1 of RESPONSE WORD 1 is zero. Current signal 40 is at current level $I_{HL}$ between time $T_5$ and time $T_6$; therefore, the logic value of BIT 2 of RESPONSE WORD 1 is one. Current signal 40 is at current level $I_{LL}$ between time $T_6$ and time $T_8$; therefore, the logic value of BIT 3 of RESPONSE WORD 1 is zero. Current signal 40 is at current level $I_{HL}$ between time $T_{10}$ and time $T_{11}$; therefore, the logic value of BIT 4 of RESPONSE WORD 1 is one. Current signal 40 is at current level $I_{HL}$ between time $T_{14}$ and time $T_{15}$; therefore, the logic value of BIT 1 of RESPONSE WORD 2 is one. Current signal 40 is at current level $I_{HL}$ between time $T_{17}$ and time $T_{18}$; therefore, the logic value of BIT 2 of RESPONSE WORD 2 is one. A logic one occurs whenever current signal 40 is between current level $I_T$ and current level $I_{HR}$. Preferably, a logic one occurs whenever current signal 40 is between current level $I_T$ and current level $I_{HR}$ for a minimum amount of time at the end of the bit. Depending on the monitor device chosen to monitor current signal 40, a minimum amount of time is the amount of time necessary for the monitor device to determine if current signal 40 is between current level $I_T$ and current level $I_{HR}$.

Figure 4:
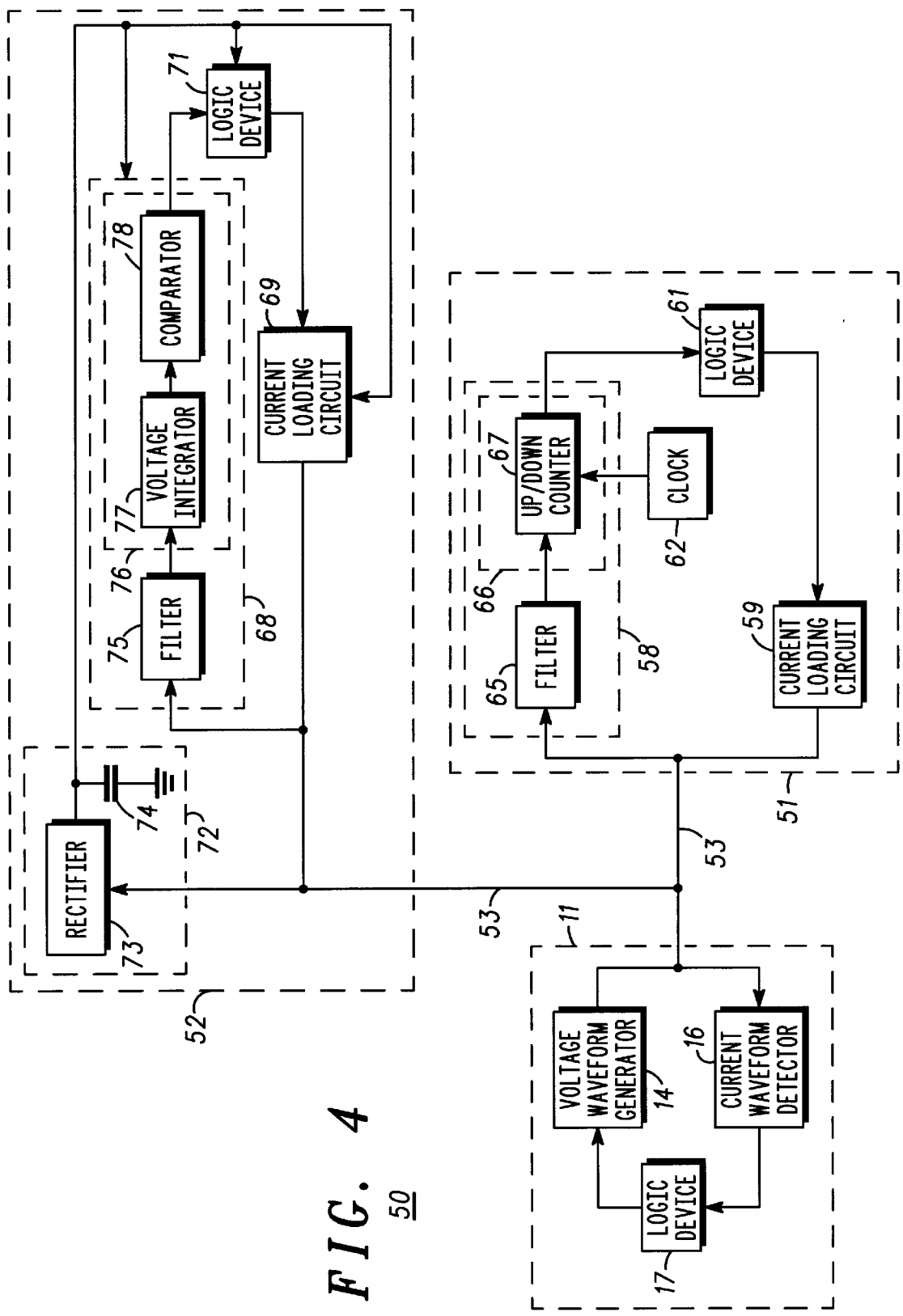
FIG. 4 is a block diagram of a bus serial communication device in accordance with another embodiment of the present invention.

FIG. 4 is a block diagram of a bus serial communication device 50 in accordance with another embodiment of the present invention. It should be understood that the same reference numerals are used in the figures to denote the same elements. Serial communication device 50 has transceiver 11, a transceiver 51, and a transceiver 52. Transceiver 11 is coupled to transceiver 51 and transceiver 52 via a transmission path 53. The output of voltage waveform generator 14 and the input of current waveform detector 16 are connected to transmission path 53.

Transceiver 51 is comprised of a voltage waveform detector 58, a current loading circuit 59, a logic device 61, and a clock 62. Voltage waveform detector 58 is comprised of a filter 65 connected to a duty cycle detector 66. The input of filter 65 is connected to the input of voltage waveform detector 58 and the output of filter 65 is connected to the input of duty cycle detector 66. The output of duty cycle detector 66 is connected to the output of voltage waveform detector 58. By way of example, duty cycle detector 66 is an up/down counter 67. The input of up/down counter 67 is connected to the input of duty cycle detector 66 and the clock input of up/down counter 67 is connected to clock 62. The output of up/down counter 67 is connected to the output of duty cycle detector 66.

The input of voltage waveform detector 58 and the output of current loading circuit 59 are connected to transmission path 53. The output of voltage waveform detector 58 is connected to the input of logic device 61 and the output of logic device 61 is connected to the input of current loading circuit 59.

Transceiver 52 is comprised of a voltage waveform detector 68, a current loading circuit 69, a logic device 71, and an energy storage device 72. Energy storage device 72 is comprised of a rectifier 73 and a capacitor 74. The input of rectifier 73 is connected to the input of energy storage device 72 and the output of rectifier 73 is connected to the output of energy storage device 72. The first terminal of capacitor 74 is connected to the output of rectifier 73 and the second terminal of capacitor 74 is coupled for receiving a power supply voltage such as, for example, ground.

Voltage waveform detector 68 is comprised of a filter 75 and a duty cycle detector 76. The input of filter 75 is connected to the input of voltage waveform detector 68 and the output of filter 75 is connected to the input of duty cycle detector 76. The output of duty cycle detector 76 is connected to the output of voltage waveform detector 68. Duty cycle detector 76 is comprised of a voltage integrator 77 and a comparator 78. The input of voltage integrator 77 is connected to the input of duty cycle detector 76 and the output of voltage integrator 77 is connected to the input of comparator 78. The output of comparator 78 is connected to the output of duty cycle detector 76.

The input of voltage waveform detector 68, the input of energy storage device 72, and the output of current loading circuit 69 are connected to transmission path 53. The output of voltage waveform detector 68 is connected to the input of logic device 71 and the output of logic device 71 is connected to the input of current loading circuit 69. The output of energy storage device 72 is commonly connected to the power input of voltage waveform detector 68, the power input of current loading circuit 69, and the power input of logic device 71.

The operation of serial communication device 50 is described with reference to FIGS. 2–4. The operation of serial communication device 50 is similar to the operation of serial communication device 10 (FIG. 1). Logic device 17 generates a serial stream of binary command data. The serial stream of binary command data is transmitted from the output of logic device 17 to the input of voltage waveform generator 14. Voltage waveform generator 14 converts the serial stream of binary command data into a pulse width modulated voltage waveform such as voltage signal 30 illustrated in FIG. 2. Voltage signal 30 is transmitted from the output of voltage waveform generator 14 to the inputs of voltage waveform detector 58, voltage waveform detector 68, and energy storage device 72.

Voltage waveform detector 58 decodes voltage signal 30 to retrieve the serial stream of binary command data. Filter 65 is a digital filter for removing noise from voltage signal 30. Duty cycle detector 66 determines the duty cycle of the bits within the command words for determining the logic value of each bit within the command words. Up/down counter 67 determines the logic value of each bit within the command words. By way of example, at the start of each bit of a command word, up/down counter 67 is reset to an initial count value and begins counting down. Up/down counter 67 counts up when voltage signal 30 transitions from voltage level $V_{LL}$ to voltage level $V_{HL}$. At the end of each bit of the command word, the final count value of up/down counter 67 is compared to the initial count value of up/down counter 67 to determine the logic value of each bit of the command word. If the final count value is greater than the initial count value between the start and end of a bit, then the amount of time voltage signal 30 is at voltage level $V_{HL}$ is greater than the amount of time voltage signal 30 is at voltage level $V_{LL}$. Thus, the logic value of the bit is one. If the final count value is less than the initial count value between the start and end of a bit, then the amount of time voltage signal 30 is at voltage level $V_{LL}$ is greater than the amount of time voltage signal 30 is at voltage level $V_{HL}$. Therefore, the logic value of the bit is zero. Clock 62 provides clocking for up/down counter 67.

The serial stream of binary command data is transmitted from the output of voltage waveform detector 58 to the input of logic device 61. Logic device 61 retrieves the binary data of the command words from the serial stream of binary command data and processes the command words. Response words are generated by logic device 61 in response to the received command words. Further, logic device 61 determines the logic value of each bit of the response words and generates a serial stream of binary response data from the binary data of the response words.

Current loading circuit 59 provides a current load for drawing current from transceiver 11. The current drawn from transceiver 11 is monitored or detected by current waveform detector 16. Current waveform detector 16 can comprise a resistor and a voltage measuring device (not shown), wherein the current drawn is monitored by determining the voltage across the resistor. Current loading circuit 59 encodes the logic value of a response bit using current signal 40. By way of example, current loading circuit 59 encodes the logic value of a response bit to a logic one by increasing current signal 40 from current level $I_{LL}$ to current level $I_{HL}$. Current loading circuit 59 provides a current load when the logic value of a response bit is one. By current loading circuit 59 providing a current load between time $T_5$ and time $T_6$ to increase current signal 40 from current level $I_{LL}$ to current level $I_{HL}$, the logic value of BIT 2 of RESPONSE WORD 1 is encoded to a logic one. By current loading circuit 59 not providing a current load between time $T_6$ and time $T_8$, the logic value of BIT 3 of RESPONSE WORD 1 is encoded to a logic zero. Current loading circuit 59 can be comprised of a current mirror circuit.

Voltage waveform detector 68 decodes voltage signal 30 to retrieve the serial stream of binary command data. Filter 75 is an analog low pass filter for removing noise from voltage signal 30 and duty cycle detector 76 determines the duty cycle of the bits within the command words for determining the logic value of each bit within the command words. Voltage integrator 77 in cooperation with comparator 78 determines the logic value of each bit within the command words. By way of example, voltage integrator 77 determines the amount of time the amplitude of voltage signal 30 is equal to amplitude $V_{LL}$ relative to the amount of time the amplitude of voltage signal 30 is equal to amplitude $V_{HL}$. At the end of each bit of the command words, comparator 78 compares a final voltage value generated by voltage integrator 77 to a reference voltage value to determine the logic value of each bit of the command words.

The serial stream of binary command data is transmitted from the output of voltage waveform detector 68 to the input of logic device 71. Logic device 71 retrieves the binary data of the command words from the serial stream of binary command data and processes the command words. Response words are generated by logic device 71 in response to the received command words.

By now it should be appreciated that a device and method for serial communication have been provided. An advantage of the present invention is that it provides a variable data rate serial communication method. Further, the present invention provides for full duplex point-to-point serial communication and full duplex bus serial communication. Another advantage of the present invention is that it provides a device and method for providing power in a serial communication system.

What is claimed is:

1. A serial communication device, comprising:

a voltage waveform generator having an input and an output;

a voltage waveform detector having an input coupled to the output of the voltage waveform generator, a power input, and an output;

a current loading circuit having an output coupled to the input of the voltage waveform detector, an input, and a power input;

a current waveform detector having an input coupled to the output of the voltage waveform generator and an output; and an energy storage device having an input coupled to the input of the voltage waveform detector and an output coupled to the power input of the voltage waveform detector and the power input of the current loading circuit.

2. The serial communication device of claim 1, wherein the energy storage device comprises:

a rectifier having an input coupled to the input of the energy storage device and an output coupled to the output of the energy storage device; and a capacitor having a first terminal coupled to the output of the rectifier and a second terminal coupled for receiving a power supply voltage.

3. A serial communication device, comprising:

a voltage waveform generator having an input and an output;

a voltage waveform detector having an input coupled to the output of the voltage waveform generator and an output;

a current loading circuit having an output coupled to the input of the voltage waveform detector and an input;

a current waveform detector having an input coupled to the output of the current loading circuit and an output;

a first logic device having an input coupled to the output of the voltage waveform detector and an output coupled to the input of the current loading circuit; and a second logic device having an input coupled to the output of the current waveform detector and an output coupled to the input of the voltage waveform generator.

4. A serial communication device, comprising:

a voltage waveform generator having an input and an output;

a voltage waveform detector having an input coupled to the output of the voltage waveform generator and an output;

a current loading circuit having an output coupled to the input of the voltage waveform detector and an input; and a current waveform detector having an input coupled to the output of the voltage waveform generator and an output, wherein the voltage waveform detector comprises:

a filter having an input coupled to the input of the voltage waveform detector and an output; and a duty cycle detector having an input coupled to the output of the filter and an output coupled to the output of the voltage waveform detector.

5. The serial communication device of claim 4, wherein the duty cycle detector comprises an up/down counter.

6. The serial communication device of claim 4, wherein the duty cycle detector comprises:

a voltage integrator having an input coupled to the input of the duty cycle detector and an output; and a comparator having an input coupled to the output of the voltage integrator and an output coupled to the output of the duty cycle detector.

7. A method for serially communicating between a first transceiver and a second transceiver, comprising the steps of:

generating a first signal;

starting a first word when the first signal crosses a first threshold level in a first direction, wherein the first direction is from a first reference level towards a second reference level;

starting a bit of the first word when the first signal crosses a second threshold level in the first direction;

ending the first word when the first signal crosses the first threshold level in a second direction, wherein the second direction is from the second reference level towards the first reference level; and ending the bit of the first word when the first signal does one of:

crosses the second threshold level in the second direction and crosses the first threshold level in the second direction or crosses the second threshold level in the second direction and crosses the second threshold level in the first direction.

8. The method of claim 7, further comprising the step of supplying power from the first transceiver to the second transceiver when the first signal is between the first threshold level and the first reference level.

9. The method of claim 7, further comprising the step of:

starting a second word when the first signal crosses the first threshold level in the first direction;

starting a bit of the second word when the first signal crosses the second threshold level in the first direction;

ending the second word when the first signal crosses the first threshold level in the second direction; and ending the bit of the second word when the first signal does one of:
crosses the second threshold level in the second direction and crosses the first threshold level in the second direction or
crosses the second threshold level in the second direction and crosses the second threshold level in the first direction.

10. The method of claim 9, further including the step of generating a second signal, wherein the step of generating a first signal includes generating a voltage signal and the step of generating a second signal includes generating a current signal.

11. The method of claim 10, further including the steps of encoding a logic value of the bit of the second word to logic one by increasing the current signal from a first current level to a second current level.

12. A method for serially communicating and supplying power between a first transceiver and a second transceiver, comprising the steps of:

generating a signal;

supplying power from the first transceiver to the second transceiver in accordance with a first threshold level;

transmitting a first command word from the first transceiver to the second transceiver in accordance with the first threshold level and a second threshold level; and transmitting a first response word from the second transceiver to the first transceiver in accordance with the first threshold level and the second threshold level.

13. The method of claim 12, wherein the step of supplying power from the first transceiver to the second transceiver further includes supplying power from the first transceiver to the second transceiver when the signal is between the first threshold level and a first reference level.

14. The method of claim 12, wherein the step of transmitting a first command word from the first transceiver to the second transceiver further includes the steps of:

starting the first command word when the signal crosses the first threshold level in a first direction, wherein the first direction is from a first reference level towards a second reference level;

starting a bit of the first command word when the signal crosses the second threshold level in the first direction;

ending the first command word when the signal crosses the first threshold level in a second direction, wherein the second direction is from the second reference level towards the first reference level; and ending the bit of the first command word when the signal does one of:
crosses the second threshold level in the second direction and crosses the first threshold level in the second direction or
crosses the second threshold level in the second direction and crosses the second threshold level in the first direction.

15. The method of claim 12, wherein the step of transmitting a first response word from the second transceiver to the first transceiver further includes the steps of:

starting the first response word when the signal crosses the first threshold level in a first direction, wherein the first direction is from a first reference level towards a second reference level;

starting a bit of the first response word when the signal crosses the second threshold level in the first direction;

ending the first response word when the signal crosses the first threshold level in a second direction, wherein the second direction is from the second reference level towards the first reference level; and ending the bit of the first response word when the signal does one of:
crosses the second threshold level in the second direction and crosses the first threshold level in the second direction or
crosses the second threshold level in the second direction and crosses the second threshold level in the first direction.

16. The method of claim 12, wherein the step of transmitting a first command word from the first transceiver to the second transceiver further includes the steps of:

starting the first command word when the signal crosses the first threshold level in a first direction, wherein the first direction is from a first reference level towards a second reference level;

starting a first bit of the first command word when the signal crosses the second threshold level in the first direction;

ending the first bit of the first command word when the signal crosses the second threshold level in a second direction and crosses the first threshold level in the second direction, wherein the second direction is from the second reference level towards the first reference level;

starting a second bit of the first command word when the first bit of the first command word ends;

ending the second bit of the first command word when the signal crosses the second threshold level in the second direction and crosses the second threshold level in the first direction; and ending the first command word when the second bit of the first command word ends.

17. The method of claim 12, further including the step of transmitting a second command word from the first transceiver to the second transceiver, wherein a word length of the first command word is greater than a word length of the second command word.

18. The method of claim 12, further including the step of transmitting a second command word from the first transceiver to the second transceiver after the first command word is transmitted, wherein a bit period of a first bit of the second command word is greater than a bit period of a second bit of the second command word.

19. The method of claim 12, further including the steps of:

transmitting a second command word from the first transceiver to the second transceiver in accordance with the first threshold level and the second threshold level; and transmitting a second response word from the second transceiver to the first transceiver in accordance with the first threshold level and the second threshold level, wherein a start of the second response word corresponds to a start of the second command word and an end of the second response word corresponds to an end of the second command word.

* * * * *